United States Patent
Hur et al.

(10) Patent No.: US 9,338,262 B2
(45) Date of Patent: May 10, 2016

(54) IPV4/IPV6 DUAL STACK SOFTWARE/HARDWARE APPARATUS AND METHOD FOR PROCESSING INTERNET PACKET

(71) Applicants: Bongjun Hur, Yongin (KR); Kiyong Lee, Seoul (KR); Wooyoul Kim, Seoul (KR); Soohwan Kim, Yongin (KR); Eunkyoung Kim, Seongnam (KR)

(72) Inventors: Bongjun Hur, Yongin (KR); Kiyong Lee, Seoul (KR); Wooyoul Kim, Seoul (KR); Soohwan Kim, Yongin (KR); Eunkyoung Kim, Seongnam (KR)

(73) Assignee: WIZNET CO., LTD., Seongnam (KR)

(*) Notice: Subject to any disclaimer, the term of this patent is extended or adjusted under 35 U.S.C. 154(b) by 159 days.

(21) Appl. No.: 14/210,452

(22) Filed: Mar. 14, 2014

(65) Prior Publication Data
US 2014/0314102 A1 Oct. 23, 2014

(30) Foreign Application Priority Data
Apr. 18, 2013 (KR) ........................ 10-2013-0042940

(51) Int. Cl.
*H04L 29/06* (2006.01)
*H04L 12/54* (2013.01)

(52) U.S. Cl.
CPC .............. *H04L 69/18* (2013.01); *H04L 69/167* (2013.01)

(58) Field of Classification Search
None
See application file for complete search history.

(56) References Cited

U.S. PATENT DOCUMENTS

2013/0044679 A1* 2/2013 Rathonyi ............ H04W 80/045
 370/328
2013/0107892 A1* 5/2013 Rubin ................... H04L 69/324
 370/474

* cited by examiner

*Primary Examiner* — Brandon Renner
(74) *Attorney, Agent, or Firm* — Patent Office of Dr. Chung Park

(57) ABSTRACT

Disclosed are an IPv4/IPv6 dual stack software/hardware apparatus for processing an Internet packet and a method thereof. The IPv4/IPv6 dual stack software/hardware apparatus for processing an internet packet includes: a hardware type packet processor configured to process the Internet packet by a system logic circuit; a software type packet processor configured to process the Internet packet according to execution of a previously prepared program; and a packet process controller configured to receive the Internet packet to control the hardware type packet processor to process the Internet packet of a preset protocol, and to control the software type packet processor to process the Internet packet of another preset protocol.

14 Claims, 5 Drawing Sheets

---

Packet process controller generates and outputs control signal for controlling hardware type packet processor to process Internet packet or a control signal for controlling software type packet processor to process internet packet according to protocol of Internet packet — S101

Hardware type packet processor processes Internet packet by system logic circuit according to control signal — S102

Software type packet processor processes Internet packet by execution of previously prepared program according to control signal — S103

IPV4/IPV6 DUAL STACK SOFTWARE/HARDWARE APPARATUS AND METHOD FOR PROCESSING INTERNET PACKET

CROSS-REFERENCE TO PRIOR APPLICATIONS

This application claims priority of Korean Patent Application No. 10-2013-0042940, filed on Apr. 18, 2013, which is all hereby incorporated by reference in its entirety.

BACKGROUND OF THE INVENTION

1. Field of the Invention

The present invention relates to an apparatus and a method for processing an internet packet, and more particularly, to an IPv4/IPv6 dual stack software/hardware apparatus for processing an internet packet and a method thereof.

2. Description of the Related Art

An internet protocol version 6 (IPv6) protocol provides greater scalability and flexibility as compared with an existing IPv4 protocol. The IPv6 protocol provides flexibility through an extension header unlike IPv4 protocol. Further, an ICMPv6 protocol also has various types according to an operation method.

In order to process the extension header and an ICMPv6 packet, a hardware device having a considerably complicated form is required.

However, since the extension header of an IPv6 packet or several ICMPv6 packets are not so frequently used, addition of a complicated hardware arrangement to process the extension header of the IPv6 packet and several ICMPv6 packets significantly degrades cost-effectiveness.

It is considerably expected that an IPv6 technology is applied to an embedded system such as a sensor node or a wireless terminal in which a system resource is significantly restrictive.

In the embedded system, there is a need for an IPv4/IPv6 packet processor having high receptivity/flexibility/maintenance satisfying various applications by using a limited resource.

Recently, there is a request for an Internet packet processor capable of processing both an IPv4 protocol and an IPv6 protocol and receiving variable factors of IPv6 when an IPv4 network and an IPv6 network coexist.

SUMMARY OF THE INVENTION

The present invention has been made in view of the above problems, and provides an IPv4/IPv6 dual stack software/hardware apparatus for processing an Internet packet.

The present invention further provides an IPv4/IPv6 dual stack software/hardware method for processing an Internet packet.

In accordance with an aspect of the present disclosure, an IPv4/IPv6 dual stack software/hardware apparatus for processing an internet packet is provided. The apparatus includes: a hardware type packet processor configured to process the Internet packet by a system logic circuit; a software type packet processor configured to process the Internet packet according to execution of a previously prepared program; and a packet process controller configured to receive the Internet packet to control the hardware type packet processor to process the Internet packet of a preset protocol, and to control the software type packet processor to process the Internet packet of another preset protocol.

The hardware type packet processor includes: an Ethernet header processing module configured to receive and process the Internet packet according to a corresponding protocol; an IPv4/IPv6 header processing module configured to process an IPv4 packet/IPv6 packet according to a corresponding protocol; and a TCP/UDP header processing module configured to process a TCP/UDP packet according to a corresponding protocol.

The software type packet processor includes: a software program memory configured to store a user program for implementing processing of the Internet packet; a buffer configured to receive and store the Internet packet from a packet data bus; and a processor configured to process the Internet packet stored in the buffer according to the user program stored in the software program memory.

The packet process controller includes: a user definition memory configured to previously set and store a definition regarding whether to process the Internet packet by the hardware type packet processor or the software type packet processor according to a protocol of the Internet packet; an IPv6 packet detection module configured to parse the Internet packet, and to detect whether the Internet packet is the IPv4 packet or the IPv6 packet to output a detection result; a next header detection module configured to detect a next header value from headers of the IPv6 packet detected by the IPv6 packet detection module to output the detected next header value; an HW/SW type packet processor state detection module configured to detect and output operation state of the hardware type packet processor and the software type packet processor; and an HW/SW packet process switch configured to receive the next header value output from the next header detection module and the operation state output from the HW/SW type packet processor state detection module based on the detection result output from the IPv6 packet detection module, and to generate and output a control signal indicating whether to process the Internet packet by the hardware type packet processor or the software type packet processor according to the definition stored in the user definition memory with reference to the received detection result, the next header value, and the operation state.

The user definition memory stores a first table in which information regarding whether to process the Internet packet by the hardware type packet processor or the software type packet processor is previously defined according to a type field value of an Ethernet header, and stores a second table in which information regarding whether to process the Internet packet by the hardware type packet processor or the software type packet processor is previously defined according to a next header value of a next header.

The IPv6 packet detection module receives a type field value of the Ethernet header from the Ethernet header processing module, compares the received type field value of the Ethernet header with the type field value stored in the first table of the user definition memory, and classifies the IPv6 packet, the IPv4 packet, an ARP, and a PPPoE packet to transfer a classification signal to the HW/SW packet process switch.

The next header detection module receives the next header value from the IPv4/IPv6 header processing module, compares the received next header value with the next header value stored in the second table of the user definition memory, and classifies a TCP, an UDP, an ICMPv6, a Hop by hop header, and a routing header to transfer a classification signal to the HW/SW packet process switch.

The HW/SW type packet processor state detection module detects current packet processing amount of the hardware type packet processor and the software type packet processor respectively to transfer a percentage of the detected current packet processing amount to the HW/SW packet process switch, and when the transferred percentage of the detected current packet processing amount is equal to or greater than a certain value, the HW/SW packet process switch performs a load balancing by the hardware type packet processor and the software type packet processor according to each field of a protocol applied to a packet so that the percentage of the detected current packet processing amount is less than the certain value.

In accordance with another aspect of the present disclosure, an IPv4/IPv6 dual stack software/hardware method for processing an internet packet is provided. The method includes: generating and outputting a control signal for controlling a hardware type packet processor to process the Internet packet or a control signal for controlling a software type packet processor to process the internet packet according to a protocol of the Internet packet by a packet process controller; processing the Internet packet by a system logic circuit according to the output control signal by a hardware type packet processor; and processing the Internet packet by execution of a previously prepared program according to the output control signal by a software type packet processor.

The processing of the Internet packet by the system logic circuit according to the output control signal by the hardware type packet processor includes: receiving and processing the Internet packet according to a corresponding protocol by an Ethernet header processing module; processing an IPv4 packet/IPv6 packet according to a corresponding protocol by a IPv4/IPv6 header processing module; and processing a TCP/UDP packet according to a corresponding protocol by a TCP/UDP header processing module.

The processing of the Internet packet by execution of a previously prepared program according to the output control signal by the software type packet processor includes: receiving the Internet packet from a packet data bus to store the received Internet packet in a buffer; and processing the stored Internet packet according to a program of a software program memory storing a user program to implement processing of the Internet packet by a processor.

The generating and outputting of the control signal for controlling the hardware type packet processor to process the Internet packet or a control signal for controlling the software type packet processor to process the internet packet according to a protocol of the Internet packet by the packet process controller includes: parsing the Internet packet to detect whether the Internet packet is the IPv4 packet or the IPv6 packet to output a detection result by a IPv6 packet detection module; detecting a next header value from headers of the IPv6 packet detected by the IPv6 packet detection module to output a next header value by a next header detection module; detecting and outputting operation state of the hardware type packet processor and the software type packet processor by an HW/SW type packet processor state detection module; and generating and output a control signal indicating whether to process the Internet packet by the hardware type packet processor and the software type packet processor according to a definition stored in a user definition memory with reference to the output detection result, the next header value, and the operation state of the hardware type packet processor and the software type packet processor by an HW/SW packet process switch.

The generating and outputting of the control signal for controlling the hardware type packet processor to process the Internet packet or a control signal for controlling the software type packet processor to process the internet packet according to a protocol of the Internet packet by the packet process controller includes: receiving a type field value of the Ethernet header from the Ethernet header processing module to compare the received type field value of the Ethernet header with a type field value stored in the user definition memory by the IPv6 packet detection module; and classifying the IPv6 packet, the IPv4 packet, an ARP, and a PPPoE packet to transfer a classification signal to the HW/SW packet process switch.

The generating and outputting of the control signal for controlling the hardware type packet processor to process the Internet packet or a control signal for controlling the software type packet processor to process the internet packet according to a protocol of the Internet packet by a packet process controller includes: receiving a next header value from the IPv4/IPv6 header processing module to compare the received next header value with the next header value previously stored in the user definition memory by the next header detection module; and classifying a TCP, an UDP, an ICMPv6, a Hop by hop header, and a routing header to transfer a classification signal to the HW/SW packet process switch.

The generating and outputting of the control signal for controlling the hardware type packet processor to process the Internet packet or a control signal for controlling the software type packet processor to process the internet packet according to a protocol of the Internet packet by the packet process controller includes: detecting current packet processing amount of the hardware type packet processor and the software type packet processor by the HW/SW type packet processor state detection module; and transferring a percentage of the detected current packet processing amount to the HW/SW packet process switch.

The generating and outputting of the control signal for controlling the hardware type packet processor to process the Internet packet or a control signal for controlling the software type packet processor to process the internet packet according to a protocol of the Internet packet by the packet process controller includes: when the transferred percentage is equal to or greater than a certain value, performing load balancing by the hardware type packet processor and the software type packet processor according to each field of a protocol applied to a packet so that the percentage of the detected current packet processing amount is less than the certain value.

According to the IPv4/IPv6 dual stack software/hardware apparatus for processing an internet packet and the method thereof, the hardware type packet processor having a high processing rate processes types of relatively frequently used protocols/packets, and the software type packet processor having a low processing rate capable of always adding a processing algorithm processes types of packets which are not frequently used or types of newly added packets so that the packets can be easily processed and both of the scalability and the flexibility of the IPv6 protocol can be accepted.

Further, when a utilization rate of one of the hardware type packet processor and the software type packet processor approaches approximately 100%, the packets can be stably processed by performing load balancing with respect to the hardware type packet processor and the software type packet processor.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Figure 1:
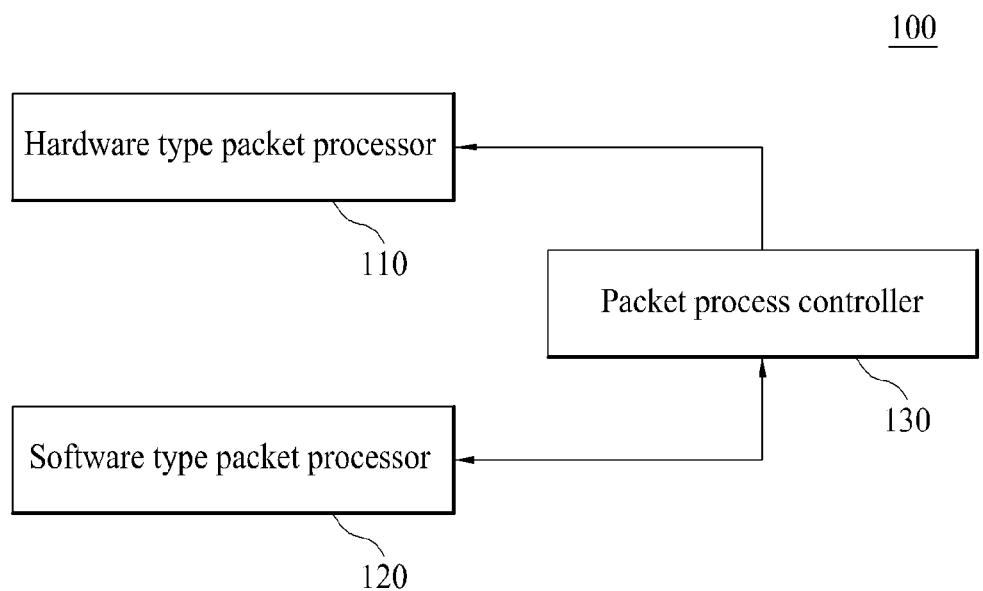
FIG. 1 is a block diagram illustrating an IPv4/IPv6 dual stack software/hardware apparatus for processing an Internet packet according to an embodiment of the present invention.

The present invention is provided so that this disclosure will be thorough and complete, and will fully convey the scope of the present inventive concept to those skilled in the art. However, the present invention is not limited to the specific embodiment, but the embodiment includes all modifications, equivalents, and substitutes belonging to the technical scope of the embodiment without departing from the spirit of the embodiment. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, an exemplary embodiment of the present invention will be described in detail with reference to accompanying drawings.

FIG. 1 is a block diagram illustrating an IPv4/IPv6 dual stack software/hardware apparatus for processing an Internet packet according to an embodiment of the present invention.

Referring to FIG. 1, the IPv4/IPv6 dual stack software/hardware apparatus for processing an Internet packet according to an embodiment of the present invention 100 (hereinafter, referred to as 'Internet packet processing apparatus') may include a hardware type packet processor 110, a software type packet processor 120, and a packet process controller 130.

The Internet packet processing apparatus 100 is a dual stack device capable of processing both of an IPv4 packet and the IPv6 packet to perform processing in a hardware scheme or a software scheme according to protocol/packet.

The Internet packet processing apparatus 100 is variably operated by using the hardware type packet processor 110 and the software type packet processor 120 in such a manner that the hardware type packet processor 110 having a high processing rate processes protocols/packets which are relatively frequently used, and the software type packet processor 120 having a low processing rate processes protocols/packets which are not frequently used. Since the software type packet processor 120 has a relatively low processing rate, but easily adds or changes a processing algorithm, the software type packet processor 120 is advantageous to process a new format of packet.

Moreover, when the hardware type packet processor 110 or the software type packet processor 120 has a high utilization rate, the Internet packet processing apparatus 100 is configured to achieve load balancing between the hardware type packet processor 110 and the software type packet processor 120 so that packet processing can be prevented from being delayed. When the utilization rate, that is, the percentage of a current processing amount to a processing capacity exceeds a certain percentage, the load balancing is automatically performed.

In more detail, when the percentage, that is, the utilization rate of the hardware type packet processor 110 or the software type packet processor 120 is equal to or greater than a certain value, for example, 95%, the Internet packet processing apparatus 100 enables the hardware type packet processor 110 and the software type packet processor 120 to perform the load balancing according to each field of a protocol applied to a current packet so that the utilization rate becomes less than 95%. That is, the Internet packet processing apparatus 100 may make the hardware type packet processor 110 or the software type packet processor 120 to perform a packet processing load according to the protocol and a specific field.

Hereinafter, a detailed configuration of the Internet packet processing apparatus 100 will be described.

The hardware type packet processor 110 is configured to process the Internet packet by a system logic circuit. Like the IPv4 scheme, a previously formalized packet processing scheme is implemented by the system logic circuit to rapidly process packets. Furthermore, it is preferable to process a type of frequently used packet among IPv6 packets by the hardware type packet processor 110.

The software type packet processor 120 is configured to process the Internet packet according to execution of a previously prepared program. The software type packet processor 120 is available to process types of packets which are not relatively frequently used, packets which are newly added to a standard, and a packet with an extension header. Although the processing rate is relatively low, since a packet processing algorithm can be easily added, the software type packet processor 120 is so available in an IPv6 protocol having a high scalability.

The packet process controller 130 may be configured to receive the Internet packet to control the hardware type packet processor 110 to process an Internet packet of a preset protocol. The packet process controller 130 may be configured to control the software type packet processor 120 to process the Internet packet of another preset protocol. As described above, the packet process controller 130 may be more suitably used by previously setting a packet processing scheme suitable for a hardware scheme or a software scheme for every packet.

Figure 2:
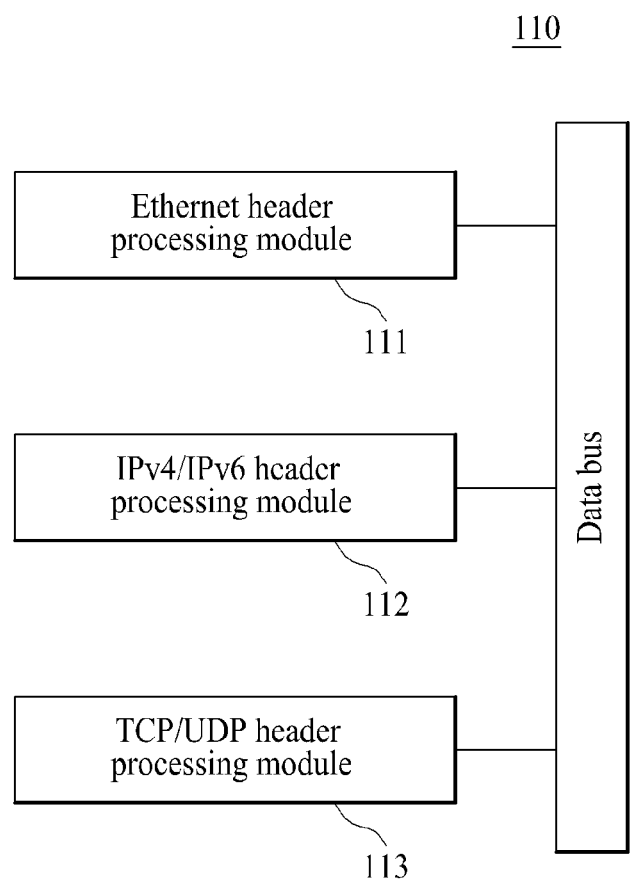
FIG. 2 is a block diagram illustrating a detailed configuration of a hardware type packet processor according to an embodiment of the present invention.

FIG. 2 is a block diagram illustrating a detailed configuration of a hardware type packet processor according to an embodiment of the present invention.

Referring to FIG. 2, the hardware type packet processor 110 according to the embodiment of the present invention may include an Ethernet header processing module 111, an IPv4/IPv6 header processing module 112, and a TCP/UDP header processing module 113.

The Ethernet header processing module 111 receives, parses, and processes the Internet packet according to a corresponding Ethernet protocol.

The IPv4/IPv6 header processing module 112 parses and processes IPv4 packet/IPv6 packet according to a corresponding protocol.

The TCP/UDP header processing module 113 parses and processes a TCP/UDP packet according to the corresponding protocol.

Figure 3:
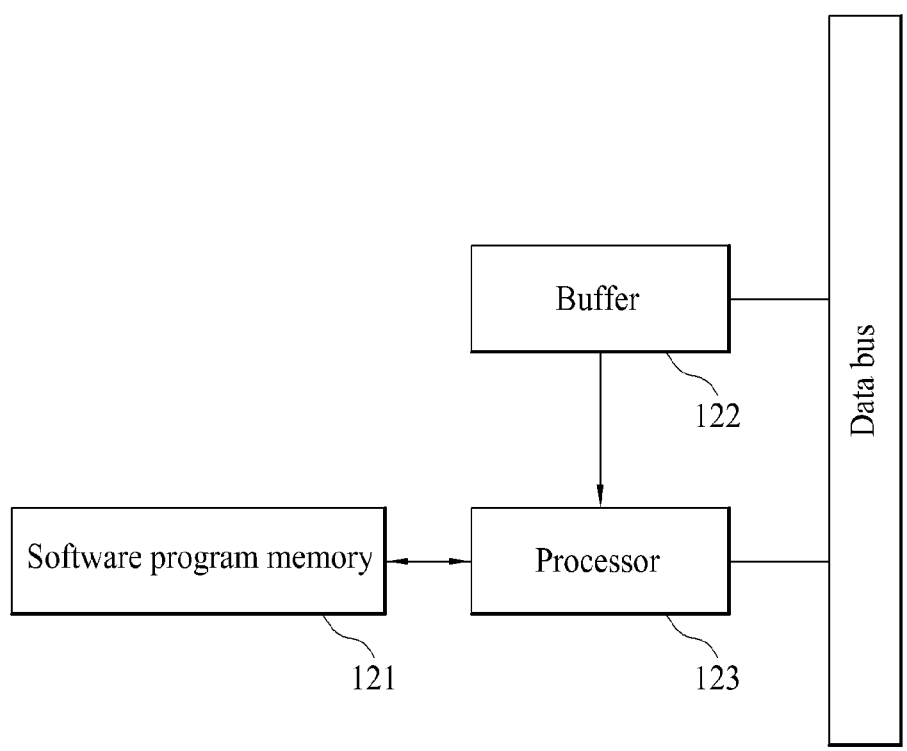
FIG. 3 is a block diagram illustrating a detailed configuration of a software type packet processor according to an embodiment of the present invention.

FIG. 3 is a block diagram illustrating a detailed configuration of a software type packet processor according to an embodiment of the present invention.

Referring to FIG. 3, the software type packet processor 120 according to the embodiment of the present invention may include a software program memory 121, a buffer 122, and a processor 123.

The software program memory 121 is configured to store a user program for implementing processing of the Internet packet. A protocol processing algorithm previously programmed by a user is stored in a memory such as a read only memory (ROM). The software program memory 121 is continuously substituted by a software program of a version added by the user so that packet processing according to a new algorithm can be performed.

The buffer 122 is configured to receive and store the Internet packet from a packet data bus.

The processor 123 is a kind of CPU, and is configured to process the Internet packet stored in the buffer 122 according to a program stored in the software program memory 121.

Figure 4:
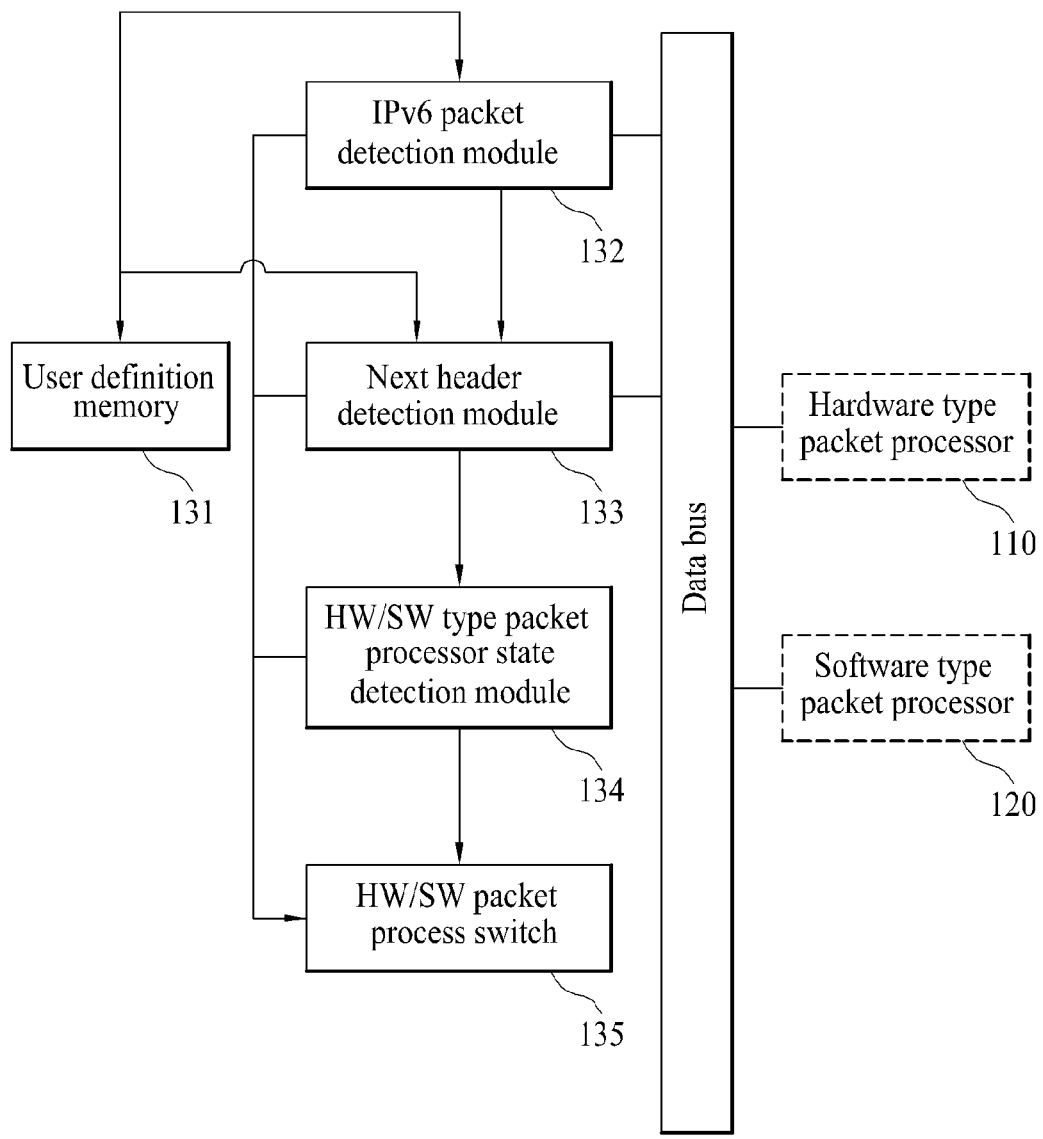
FIG. 4 is a block diagram illustrating a detailed configuration of a packet process controller according to an embodiment of the present invention.

FIG. 4 is a block diagram illustrating a detailed configuration of a packet process controller according to an embodiment of the present invention.

Referring to FIG. 4, the packet process controller 130 according to an embodiment of the present invention may include a user definition memory 131, an IPv6 packet detection module 132, a next header detection module 133, a HW/SW type packet processor state detection module 134, and a HW/SW packet process switch 135.

The user definition memory 131 is configured to previously set and store a definition regarding whether to process the Internet packet by the hardware type packet processor 110 or the software type packet processor 120 according to protocol/type of the Internet packet. The definition is previously programmed and stored by the user.

The user definition memory 131 is configured to previously set and store a first table in which information regarding whether to process the Internet packet by the hardware type packet processor 110 or the software type packet processor 120 is previously defined according to a type field value of an Ethernet header. The Internet packet is configured to select the hardware type packet processor 110 or the software type packet processor 120 according to the type field value.

Further, the user definition memory 131 is configured to store a second table in which information regarding whether to process the Internet packet by the hardware type packet processor 110 or the software type packet processor 120 is previously defined according to a next header value of a next header.

The IPv6 packet detection module 132 is configured to parse the Internet packet, to detect whether the Internet packet is an IPv4 packet or the IPv6 packet, and to output the detection result to the HW/SW packet process switch 135.

The IPv6 packet detection module 132 is configured to receive the type field value of the Ethernet header from the Ethernet header processing module 111, and to compare the received type field value of the Ethernet header with a type field value stored in the first table of the user definition memory 131.

In addition, the IPv6 packet detection module 132 is configured to classify the IPv6 packet, the IPv4 packet, an ARP, and a PPPoE packet based on the comparison to transfer a classification signal to the HW/SW packet process switch 135.

The next header detection module 133 detects a next header value from headers of the IPv6 packet detected by the IPv6 packet detection module 132 to output the detected next header value to the HW/SW packet process switch 135.

The next header detection module 133 is configured to receive a next header value from the IPv4/IPv6 header processing module 112, and to compare the received next header value with a next header value stored in the second table of the user definition memory 131.

The next header detection module 133 is configured to classify a TCP, an UDP, an ICMPv6, a Hop by hop header, and a routing header based on the comparison to transfer a classification signal to the HW/SW packet process switch 135.

The HW/SW type packet processor state detection module 134 is configured to detect operation state of the hardware type packet processor 110 and the software type packet processor 120 and to output the detected operation state to the HW/SW packet process switch 135.

The HW/SW type packet processor state detection module 134 is configured to detect a current packet processing amount of the hardware type packet processor 110 and the software type packet processor 120 and to transfer a percentage of the detected current packet processing amount to the HW/SW packet process switch 135. This operation is performed for the purpose of preventing a processor having a large usage from being delayed.

The HW/SW packet process switch 135 is configured to receive the next header value output from the next header detection module 133, and the operation state of the hardware type packet processor 110 and the software type packet processor 120 output from the HW/SW type packet processor state detection module 134 based on the detection result output from the IPv6 packet detection module 132.

The HW/SW packet process switch 135 is configured to generate a control signal indicating whether to process the Internet packet by the hardware type packet processor 110 or the software type packet processor 120 according to the definition stored in the user definition memory 131 with reference to the received detection result, the next header value, and the operation state to output the control signal to the hardware type packet processor 110 or the software type packet processor 120.

Further, when the percentage received from the HW/SW type packet processor state detection module 134 is equal to or greater than a certain value, the HW/SW packet process switch 135 reduces the percentage by performing the load balancing for the hardware type packet processor 110 or the software type packet processor 120. In addition, it is preferable to transfer and process a packet having a high utilization rate from a processor having a low utilization rate. In this case, the packet should be able to be processed in both of the hardware type packet processor 110 and the software type packet processor 120.

In more detail, when the percentage, that is, the utilization rate of the hardware type packet processor 110 or the software type packet processor 120 is equal to or greater than the certain value, the HW/SW packet process switch 135 performs the load balancing.

For example, when the percentage, that is, the utilization rate of one of the hardware type packet processor 110 and the software type packet processor 120 is equal to or greater than 95%, a load of a packet processor having a utilization rate of 95% or greater is transferred to another packet processor so that the percentage is less than 95%. In this case, the HW/SW packet process switch 135 may perform the load balancing according to each field of a protocol applied to a current packet. The HW/SW packet process switch 135 may be configured to enable the hardware type packet processor 110 to process a packet processing load with respect to packets of a specific protocol and a specific field or the software type packet processor 120 to process a packet processing load with respect to packets of another specific protocol and another specific field.

As an example of the load balancing, since the hardware type packet processor 110 is advantageous in view of a rate, if both of the hardware type packet processor 110 and the software type packet processor 120 may process the Internet packet, the hardware type packet processor 110 is advantageous to process the packet processing load. When the hardware type packet processor 110 cannot process a certain packet having an extension field of IPv6, the software type packet processor 120 should unconditionally process the packet processing load.

A detailed algorithm of the load balancing may be variously configured for the most suitable optimal processing.

Figure 5:
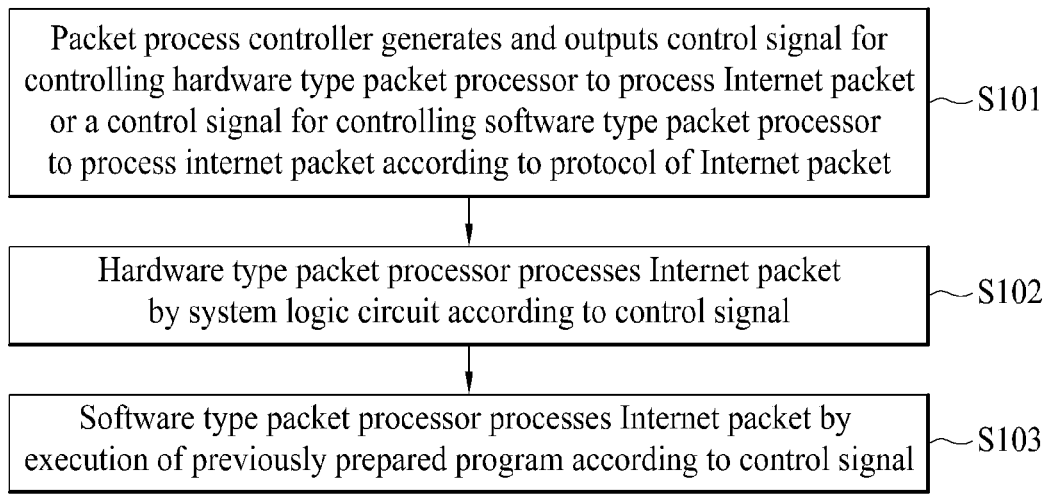
FIG. 5 is a flowchart illustrating an IPv4/IPv6 dual stack software/hardware method for processing an Internet packet according to an embodiment of the present invention.

FIG. 5 is a block diagram illustrating an IPv4/IPv6 dual stack software/hardware method for processing an Internet packet according to an embodiment of the present invention.

Referring to FIG. 5, the packet process controller 130 generates and outputs a control signal for controlling the hardware type packet processor 110 to process the Internet packet or a control signal for controlling the software type packet processor 120 to process the internet packet according to a protocol of the Internet packet (S101).

In this case, the IPv6 packet detection module 132 may be configured to parse the Internet packet, to detect whether the Internet packet is an IPv4 packet or the IPv6 packet, and to output the detection result. In addition, the next header detection module 133 may detect a next header value from headers of the IPv6 packet detected by the IPv6 packet detection module 132 to output a next header value, and the HW/SW type packet processor state detection module 134 may detect and output operation state of the hardware type packet processor 110 and the software type packet processor 120.

The HW/SW packet process switch 135 is configured to generate and output a control signal indicating whether to process the Internet packet by the hardware type packet processor 110 or the software type packet processor 120 according to the definition stored in the user definition memory 131 with reference to the output detection result, the next header value, and the operation state.

Meanwhile, the IPv6 packet detection module 132 may be configured to receive the type field value of the Ethernet header from the Ethernet header processing module 111, and to compare the received type field value of the Ethernet header with a type field value stored in the user definition memory 131, and to classify the IPv6 packet, the IPv4 packet, an ARP, and a PPPoE packet based on the comparison to transfer a classification signal to the HW/SW packet process switch 135.

Further, the next header detection module 133 may be configured to receive a next header value from the IPv4/IPv6 header processing module 112, and to compare the received next header value with a next header value stored in the user definition memory 131, and to classify a TCP, an UDP, an ICMPv6, a Hop by hop header, and a routing header based on the comparison to transfer a classification signal to the HW/SW packet process switch 135.

Meanwhile, the HW/SW type packet processor state detection module 134 may be configured to detect current packet processing amount of the hardware type packet processor 110 and the software type packet processor 120 and to transfer percentage of the detected current packet processing amount to the HW/SW packet process switch 135.

Meanwhile, when the percentage that the HW/SW packet process switch 135 previously received is equal to or greater than a certain value, the HW/SW packet process switch 135 may be configured to perform the load balancing for the hardware type packet processor 110 or the software type packet processor 120 which has a utilization rate equal to or greater than the certain value so that the percentage does not exceed the certain value.

In more detail, when the percentage, that is, the utilization rate of the hardware type packet processor 110 or the software type packet processor 120 is equal to or greater than the certain value, the HW/SW packet process switch 135 performs the load balancing.

For example, when the percentage, that is, the utilization rate of one of the hardware type packet processor 110 and the software type packet processor 120 is equal to or greater than 95%, the load of a packet processor having a utilization rate of 95% or greater is transferred to another packet processor so that the percentage becomes less than 95%. In this case, the HW/SW packet process switch 135 may perform the load balancing according to each field of a protocol applied to a current packet. The HW/SW packet process switch 135 may be configured to enable the hardware type packet processor 110 to process the packet processing load for a specific protocol and a specific field, or enable the software type packet processor 120 to process the packet processing load for packets of another specific protocol and another specific field.

As an example of the load balancing, since the hardware type packet processor 110 is advantageous in view of a rate, if both of the hardware type packet processor 110 and the software type packet processor 120 are able to process the Internet packet, the hardware type packet processor 110 is advantageous to process the packet processing load. When the hardware type packet processor 110 cannot process a certain packet having the extension field of IPv6, the software type packet processor 120 should unconditionally process the packet processing load.

A detailed algorithm of the load balancing may be variously configured for the most suitable optimal processing.

Next, the hardware type packet processor 110 processes the Internet packet by a system logic circuit according to the previously output control signal (S102).

In this case, the Ethernet header processing module 111 may be configured to receive and process the Internet packet according to a corresponding protocol. In addition, the IPv4/IPv6 header processing module 112 may be configured to process IPv4 packet/IPv6 packet according to a corresponding protocol, and the TCP/UDP header processing module 113 may be configured to process a TCP/UDP packet according to a corresponding protocol.

After that, the software type packet processor 120 processes the Internet packet by execution of a previously prepared program according to the previously output control signal (S103).

In this case, the processor 123 may be configured to receive the Internet packet from a packet data bus to store the received Internet packet in the buffer 122, and to process the previously stored Internet packet according to a program of the software program memory 121 storing a user program to implement processing of the Internet packet.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. An IPv4/IPv6 dual stack software/hardware apparatus for processing an internet packet, the apparatus comprising:
   a hardware type packet processor configured to process the Internet packet by a system logic circuit;
   a software type packet processor configured to process the Internet packet according to execution of a previously prepared program; and
   a packet process controller configured to receive the Internet packet to control the hardware type packet processor to process the Internet packet of a preset protocol, and to control the software type packet processor to process the Internet packet of another preset protocol;
   wherein the packet process controller includes:
      a user definition memory configured to previously set and store a definition regarding whether to process the Internet packet by the hardware type packet processor or the software type packet processor according to a protocol of the Internet packet;
      an IPv6 packet detection processor configured to parse the Internet packet, and to detect whether the Internet packet is the IPv4 packet or the IPv6 packet to output a detection result;
      a next header detection processor configured to detect a next header value from headers of the IPv6 packet detected by the IPv6 packet detection processor to output the detected next header value;
      an HW/SW type packet processor state detection processor configured to detect and output operation state of the hardware type packet processor and the software type packet processor; and
      an HW/SW packet process switch configured to receive the next header value output from the next header detection processor and the operation state output from the HW/SW type packet processor state detection processor based on the detection result output from the IPv6 packet detection processor, and to generate and output a control signal indicating whether to process the Internet packet by the hardware type packet processor or the software type packet processor according to the definition stored in the user definition memory with reference to the received detection result, the next header value, and the operation state.

2. The apparatus of claim 1, wherein the hardware type packet processor comprises:
   an Ethernet header processor configured to receive and process the Internet packet according to a corresponding protocol;
   an IPv4/IPv6 header processor configured to process an IPv4 packet/IPv6 packet according to a corresponding protocol; and
   a TCP/UDP header processor configured to process a TCP/UDP packet according to a corresponding protocol.

3. The apparatus of claim 1, wherein the software type packet processor comprises:
   a software program memory configured to store a user program for implementing processing of the Internet packet;
   a buffer configured to receive and store the Internet packet from a packet data bus; and
   a processor configured to process the Internet packet stored in the buffer according to the user program stored in the software program memory.

4. The apparatus of claim 1, wherein the user definition memory stores a first table in which information regarding whether to process the Internet packet by the hardware type packet processor or the software type packet processor is previously defined according to a type field value of an Ethernet header, and
   stores a second table in which information regarding whether to process the Internet packet by the hardware type packet processor or the software type packet processor is previously defined according to a next header value of a next header.

5. The apparatus of claim 4, wherein the IPv6 packet detection processor receives a type field value of the Ethernet header from the Ethernet header processing processor, compares the received type field value of the Ethernet header with the type field value stored in the first table of the user definition memory, and classifies the IPv6 packet, the IPv4 packet, an ARP, and a PPPoE packet to transfer a classification signal to the HW/SW packet process switch.

6. The apparatus of claim 5, wherein the next header detection processor receives the next header value from the IPv4/IPv6 header processing processor, compares the received next header value with the next header value stored in the second table of the user definition memory, and classifies a TCP, an UDP, an ICMPv6, a Hop by hop header, and a routing header to transfer a classification signal to the HW/SW packet process switch.

7. The apparatus of claim 6, wherein the HW/SW type packet processor state detection processor detects current packet processing amount of the hardware type packet processor and the software type packet processor respectively to transfer a percentage of the detected current packet processing amount to the HW/SW packet process switch, and
   when the transferred percentage of the detected current packet processing amount is equal to or greater than a certain value, the HW/SW packet process switch performs a load balancing by the hardware type packet processor and the software type packet processor according to each field of a protocol applied to a packet so that the percentage of the detected current packet processing amount is less than the certain value.

8. An IPv4/IPv6 dual stack software/hardware method for processing an internet packet, the method comprising:

generating and outputting a control signal for controlling a hardware type packet processor to process the Internet packet or a control signal for controlling a software type packet processor to process the internet packet according to a protocol of the Internet packet by a packet process controller;

processing the Internet packet by a system logic circuit according to the output control signal by a hardware type packet processor; and processing the Internet packet by execution of a previously prepared program according to the output control signal by a software type packet processor, wherein the processing the internet packet by the system logic comprises:
  receiving and processing the Internet packet according to a corresponding protocol by an Ethernet header processor;
  processing an IPv4 packet/IPv6 packet according to a corresponding protocol by a IPv4/IPv6 header processor; and
  processing a TCP/UDP packet according to a corresponding protocol by a TCP/UDP header processor; and wherein the generating and outputting of the control signal for controlling a hardware type packet processor comprises:
  parsing the Internet packet to detect whether the Internet packet is the IPv4 packet or the IPv6 packet to output a detection result by a IPv6 packet detection processor;
  detecting a next header value from headers of the IPv6 packet detected by the IPv6 packet detection processor to output a next header value by a next header detection processor;
  detecting and outputting operation state of the hardware type packet processor and the software type packet processor by an HW/SW type packet processor state detection processor; and
  generating and output a control signal indicating whether to process the Internet packet by the hardware type packet processor and the software type packet processor according to a definition stored in a user definition memory with reference to the output detection result, the next header value, and the operation state of the hardware type packet processor and the software type packet processor by an HW/SW packet process switch.

9. The method of claim 8, wherein the processing of the Internet packet by execution of a previously prepared program according to the output control signal by the software type packet processor comprises:
  receiving the Internet packet from a packet data bus to store the received Internet packet in a buffer; and
  processing the stored Internet packet according to a program of a software program memory storing a user program to implement processing of the Internet packet by a processor.

10. The method of claim 8, wherein the generating and outputting of the control signal for controlling the hardware type packet processor to process the Internet packet or a control signal for controlling the software type packet processor to process the internet packet according to a protocol of the Internet packet by the packet process controller comprises:
  receiving a type field value of the Ethernet header from the Ethernet header processor to compare the received type field value of the Ethernet header with a type field value stored in the user definition memory by the IPv6 packet detection processor; and
  classifying the IPv6 packet, the IPv4 packet, an ARP, and a PPPoE packet to transfer a classification signal to the HW/SW packet process switch.

11. The method of claim 10, wherein the generating and outputting of the control signal for controlling the hardware type packet processor to process the Internet packet or a control signal for controlling the software type packet processor to process the internet packet according to a protocol of the Internet packet by a packet process controller comprises:
  receiving a next header value from the IPv4/IPv6 header processor to compare the received next header value with the next header value previously stored in the user definition memory by the next header detection processor; and
  classifying a TCP, an UDP, an ICMPv6, a Hop by hop header, and a routing header to transfer a classification signal to the HW/SW packet process switch.

12. The method of claim 11, wherein the generating and outputting of the control signal for controlling the hardware type packet processor to process the Internet packet or a control signal for controlling the software type packet processor to process the internet packet according to a protocol of the Internet packet by the packet process controller comprises:
  detecting current packet processing amount of the hardware type packet processor and the software type packet processor by the HW/SW type packet processor state detection processor; and
  transferring a percentage of the detected current packet processing amount to the HW/SW packet process switch.

13. The method of claim 12, wherein the generating and outputting of the control signal for controlling the hardware type packet processor to process the Internet packet or a control signal for controlling the software type packet processor to process the internet packet according to a protocol of the Internet packet by the packet process controller comprises:
  when the transferred percentage is equal to or greater than a certain value, performing load balancing by the hardware type packet processor and the software type packet processor according to each field of a protocol applied to a packet so that the percentage of the detected current packet processing amount is less than the certain value.

14. The apparatus of claim 3, wherein the packet process controller comprises:
  a user definition memory configured to previously set and store a definition regarding whether to process the Internet packet by the hardware type packet processor or the software type packet processor according to a protocol of the Internet packet;
  an IPv6 packet detection module configured to parse the Internet packet, and to detect whether the Internet packet is the IPv4 packet or the IPv6 packet to output a detection result;
  a next header detection module configured to detect a next header value from headers of the IPv6 packet detected by the IPv6 packet detection module to output the detected next header value;
  an HW/SW type packet processor state detection module configured to detect and output operation state of the hardware type packet processor and the software type packet processor; and an HW/SW packet process switch configured to receive the next header value output from the next header detection module and the operation state output from the HW/SW type packet processor state detection module based on the detection result output from the IPv6 packet detection module, and to generate and output a control signal indicating whether to process the Internet packet by the hardware type packet processor or the software type packet processor according to the definition stored in the user definition memory with reference to the received detection result, the next header value, and the operation state.

* * * * *